United States Patent [19]
Qian et al.

[11] Patent Number: 5,910,905
[45] Date of Patent: Jun. 8, 1999

[54] SYSTEM AND METHOD FOR DETECTION OF DISPERSED BROADBAND SIGNALS

[75] Inventors: Shie Qian, Austin, Tex.; Mark E. Dunham, Los Alamos, N.M.

[73] Assignee: National Instruments Corporation, Austin, Tex.

[21] Appl. No.: 08/744,435

[22] Filed: Nov. 8, 1996

Related U.S. Application Data

[63] Continuation-in-part of application No. 08/322,054, Oct. 12, 1994, abandoned.

[51] Int. Cl.[6] ................................................. G06F 17/10
[52] U.S. Cl. ............................. 364/724.08; 364/724.16
[58] Field of Search .......................... 364/724.08, 724.11, 364/724.16; 375/497

[56] References Cited

U.S. PATENT DOCUMENTS 5,272,724   12/1993   Solomon et al. ..................... 375/497

Primary Examiner—Tan V. Mai
Attorney, Agent, or Firm—Conley, Rose & Tayon; Jeffrey C. Hood

[57] ABSTRACT

A system and method for detecting the presence of dispersed broadband signals in real time. The present invention utilizes a bank of matched filters for detecting the received dispersed broadband signals. Each matched filter uses a respective robust time template that has been designed to approximate the dispersed broadband signals of interest, and each time template varies across a spectrum of possible dispersed broadband signal time templates. The received dispersed broadband signal x(t) is received by each of the matched filters, and if one or more matches occurs, then the received data is determined to have signal data of interest. This signal data can then be analyzed and/or transmitted to Earth for analysis, as desired. The system and method of the present invention will prove extremely useful in many fields, including satellite communications, plasma physics, and interstellar research. The varying time templates used in the bank of matched filters are determined as follows. The robust time domain template is assumed to take the form w(t)=A(t) cos{2φ(t)}. Since the instantaneous frequency f(t) is known to be equal to the derivative of the phase φ(t), the trajectory of a joint time-frequency representation of x(t) is used as an approximation of φ'(t).

30 Claims, 10 Drawing Sheets

SYSTEM AND METHOD FOR DETECTION OF DISPERSED BROADBAND SIGNALS

CONTINUATION DATA

This is a continuation-in-part of patent application Ser. No. 08/322,054 titled "System and Method for Detection of Dispersed Broadband Signals" and filed Oct. 12, 1994, now abandoned whose inventors were Shie Qian and Mark E. Dunham.

The U.S. Government has a paid-up license in this invention and the right in limited circumstances to require the patent owner to license others on reasonable terms as provided for by the terms of contract No. W-7405-ENG-36 awarded by The Department of Energy (DOE).

FIELD OF THE INVENTION

The present invention relates to the detection of dispersed broadband signals, and more particularly to a system including a matched filter bank which uses different time templates derived from a time template equation that is designed to match the signals of interest.

DESCRIPTION OF THE RELATED ART

In many fields it would be greatly desirable to be able to detect the presence of dispersed broadband signals. For example, plasma physics is a field of physics which relates to the study of highly ionized gases, and the term "plasma" is used to refer to a gas which is composed of a nearly equal number of positive and negative free charges (positive ions and electrons). Because plasma is composed of charged particles, plasma exhibits many phenomena not encountered in ordinary gases. Practical interest in plasma physics arises from various applications of gas discharges, including the study of electron beams in electron tubes, the study of ultra-high-temperature processes, controlled fusion and the study of plasma effects evident in astrophysical phenomenon. In the field of plasma physics, in many cases it is desirable to detect the presence of a broadband signal that has become dispersed or corrupted due to transmission through plasma.

The field of astrophysical research is related to the field of plasma physics. For example, the majority of the matter in the universe exists in the plasma state both in stellar atmospheres and in interstellar space. Plasma phenomena are also observed in the tenuous ionized gases of the earth's outer atmosphere. Broadband signals that travel through plasma become heavily dispersed and generally possess a very low signal-to-noise ratio. In other words, the broadband signal becomes heavily dispersed, i.e., very corrupted. Therefore, the ability to detect broadband signals that have become heavily dispersed is greatly desired in both the fields of plasma physics and astrophysical research.

The real time detection of dispersed broadband signals is also greatly desired in the field of satellite communications. In many applications a satellite orbiting the Earth is monitoring radio transmissions from the Earth for a broadband signal s(t) of interest. Signals traveling from the Earth to a satellite are required to pass through the ionosphere in order to reach the satellite. The ionosphere is the portion of the upper atmosphere which is sufficiently ionized by solar ultraviolet radiation so that the concentration of free electrons in the ionosphere affects the propagation of radio waves. A challenging problem in satellite communications is the detection of signals of interest that travel through the ionosphere.

A signal of interest s(t) that travels through an ionized gas (plasma) or the ionosphere becomes heavily dispersed resulting in a new signal referred to as x(t). The dispersed signal x(t) generally possesses a very low signal to noise ratio, i.e., the received signal x(t) is very corrupted. Therefore, the detection of these signals has proved very difficult.

Many satellite monitoring applications comprise the monitoring of natural phenomena, such as lightning, tornadoes and earthquakes, etc. For example, the analysis of impulsive signal events caused by lightning are an important aspect of research in climate change and global electrodynamics. In the monitoring of natural phenomena, the received signal x(t) of interest only appears a few times a day and then only lasts a few milliseconds when it does appear. In other words, the majority of the data collected by the satellite is useless information. The bandwidth of these broadband signals is generally approximately 75 MHz, and thus the corresponding sampling rate which would be required to be used is 150 MHz, corresponding to 150 million samples per second. A tremendous amount of memory would be required in a satellite to store each of these samples, and in addition a tremendous amount of communications bandwidth would be required to provide this data back to the respective Earth station for processing. Therefore, a principle issue in effective transionospheric signal detection and analysis has been to detect the presence of signals of interest x(t) in real time and thus reduce the amount of data needed for transmission to Earth.

As mentioned above, there are several problems with detecting the transionospheric signal x(t) of interest. First, it is difficult to accurately detect the signal x(t) because in most applications the signal to noise ratio of x(t) is less than 0 db. In addition, since the bandwidth of the signal x(t) is typically around 75 MHz, a very large amount of sampling is required. Hence, it is impractical to store all of the data in the satellite or to send all of this data back to the Earth station.

One known method is currently used to attempt to analyze transionospheric signals received by a satellite to detect the presence of signals of interest in the received signal x(t) and thus reduce the amount of data required to send back to Earth. This method is a proprietary method that is believed to be practiced at Los Alamos National Laboratory. It is known that this method produces many false alarms, very often transmitting data back to Earth that does not contain any data of interest. Consequently, considerable memory and communication resources are wasted.

Therefore, an improved system and method is desired for detecting dispersed broadband signals. Such a system and method would have applications in a number of various fields.

SUMMARY OF THE INVENTION

The present invention comprises a system and method for detecting the presence of dispersed broadband signals x(t) in real time. The system and method of the present invention will prove extremely useful in many fields, including satellite communications, plasma physics, and interstellar research, among others.

The present invention utilizes one or more filters in a matched filter bank for detecting the received dispersed broadband signals. In the preferred embodiment, sixteen matched filters are used in the bank, although a greater or lesser number of filters can be used as desired. Each matched filter compares the received dispersed broadband signal x(t) with a different respective time template $w_R(t)$ that has been designed to approximate the dispersed broadband signals of interest. Each matched filter uses a different respective time template $w_k(t)$ derived from a single time template equation. If one or more matches occur, then the received data is determined to have signal data of interest. This signal data can then be analyzed and/or transmitted to Earth for analysis, as desired.

In one embodiment, the filter bank comprises at least one digital signal processor (DSP) and at least one memory. The DSP includes an input which receives signals. The memory is coupled to the DSP and stores code and data used by the DSP. The memory stores a program executable by the DSP to perform a filter function, preferably a matched filter function. The memory also stores a plurality of different sets of time template parameters, wherein each of the plurality of different sets of time template parameters corresponds to a respective time template. The number of different sets of time template parameters corresponds to the number of different time templates, i.e., the number of different filters in the filter bank.

As discussed further below, each of the different sets of time template parameters is generated from the time template equation:

$$w_k(t) = \cos\{2\pi(f_\infty t - 2\sqrt{Kt})\}A(t)$$

or $$w_k(t) = A(t)\cos\{2\pi(2\sqrt{Kt})\}$$

where $A(t)$ is an amplitude; K is the curvature constant for the dispersed broadband signal; and the instantaneous frequency of the dispersed broadband signal asymptotically converges to $f\infty$. The value K is preferably different for each of the different sets of time template parameters, thus producing different time templates used in the matched filter comparisons.

The DSP executes the filter function code stored in the memory to perform the filter function using each of the plurality of different sets of time template parameters. In other words, for a sample of the received signal, the DSP executes the filter function code stored in the memory with each set of time template parameters. Execution of the filter function code using each of the different sets of time template parameters causes the DSP to compare the received signals with the respective time templates. The DSP then generates a signal indicative of the presence of the dispersed broadband signal based on these comparisons.

In one embodiment, a plurality of DSPs are used to implement each of the filters in the filter bank. In another embodiment, the filters are implemented with analog circuitry.

The varying time templates used in the matched filter bank are determined as follows. The robust time domain template is assumed to be of the order of $w(t)=A(t)\cos\{2\pi\phi(t)\}$. In other words, the dispersed signal $x(t)$ can be represented as an amplitude and phase according to the equation $A(t)\cos\{2\pi\phi(t)\}$. The instantaneous frequency is known to be equal to the derivative of the phase $\phi(t)$. The present invention uses the trajectory of a joint time-frequency representation of $x(t)$ as an approximation of the instantaneous frequency function $\phi'(t)$.

First, numerous data samples of the received signal $x(t)$ are collected. A joint time frequency distribution series is then applied to represent the signal, preferably using the time frequency distribution series (also known as the Gabor spectrogram). The joint time-frequency transformation represents the analyzed signal energy at time t and frequency $f$, P(t,f), which is a three-dimensional plot of time vs. frequency vs. signal energy. Then P(t,f) is reduced to a multi-valued function f(t), a two dimensional plot of time vs. frequency, using a thresholding process. Curve fitting steps are then performed on the time/frequency plot, preferably using Levenberg-Marquardt curve fitting techniques, to derive a general instantaneous frequency function $\phi'(t)$ which best fits the multivalued function f(t), a trajectory of the joint time-frequency domain representation of $x(t)$.

The formula discovered according to the present invention which describes the band limited chirp trajectory for a chirp signal whose frequency content monotonically increases with time was found to be $$t = t_0 + \frac{K}{[f_\infty - \phi'(t)]^2}, \qquad f_0 \leq \phi'(t) < f_\infty$$

where $t_0$ is the arrival time of the non-linear chirp signal, and K is the curvature constant for the chirp. $\phi'(t)$ asymptotically converges to $f\infty$. It has been discovered that the above equation perfectly fits all non-linear chirp patterns encountered in real time applications with different parameter settings.

The term $t_0$ is set equal to 0 and the instantaneous frequency $\phi'(t)$ is determined to be $$\phi'(t) = f_\infty - \sqrt{\frac{K}{t}}$$

where $f_0 \leq \phi'(t) < f\infty$. Integrating $\phi'(t)$ along t yields $$\phi(t) = f_\infty t - 2\sqrt{Kt}.$$

Substituting $\phi(t)$ into w(t) yields:

$$w_k(t) = \cos\{2\pi(f_\infty t - 2\sqrt{Kt})\}\left\{U\left(t - \frac{K}{(f_\infty - f_0)^2}\right) - U\left(t - \frac{K}{(f_\infty - f_s/2)^2}\right)\right\}$$

where $f_S$ denotes the sampling frequency, which is twice the highest frequency contained in $x(t)$. $U(t)$ denotes the unit step function, which is used to generate the amplitude function as $$A(t) = U\left[t - \frac{K}{(f_\infty - f_0)^2}\right] - U\left[t - \frac{K}{(f_\infty - f_s/2)^2}\right],$$

which ensures that the time template $w_k(t)$ sweeps from $f_0$ to $f_S/2$. Different forms of this time template varying by the parameter K are preferably used by each of the matched filters. These varying time templates are used in a bank of matched filters according to the present invention to detect the desired signals of interest.

The instantaneous frequency function discovered according to the present invention which describes the band limited chirp trajectory for a chirp signal whose frequency content monotonically decreases with time was found to be $$\phi'(t) = \sqrt{\frac{K}{t}}$$

Integrating $\phi'(t)$ along t yields $$\phi(t) = 2\sqrt{Kt}$$

Substituting this into the general form of the time template equation yields $$w_k(t)=A(t)\cos\{2\pi(2\sqrt{Kt})\}$$

Different forms of this time template varying by the parameter K are preferably used by each of the matched filters to detect the signals of interest.

BRIEF DESCRIPTION OF THE DRAWINGS

A better understanding of the present invention can be obtained when the following detailed description of the preferred embodiment is considered in conjunction with the followings drawings, in which.

DETAILED DESCRIPTION OF THE PREFERRED EMBODIMENT

Figure 1A:
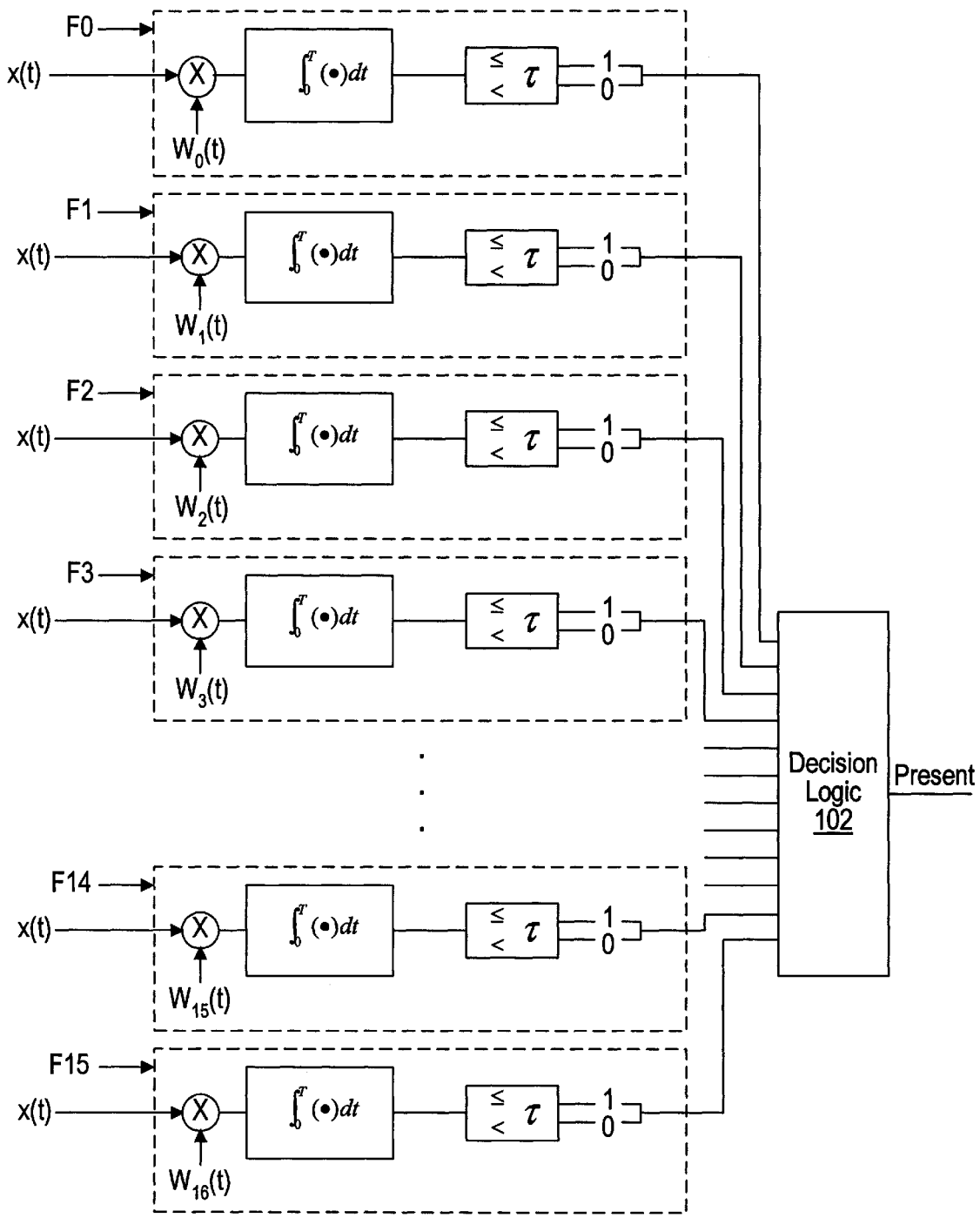
FIG. 1A illustrates a mathematical representation of a matched filter bank for detecting received Versed broadband signals according to the present invention.

Referring now to FIG. 1A, a mathematical representation of a matched filter bank for detecting dispersed broadband signals according to the present invention is shown of the present invention is shown. In the present embodiment, 16 matched filters $F_0$–$F_{15}$ are used. Analog filters are preferably used because of the large amount of processing that would be required for digital filters. However, it is noted that in applications where the amount of processing can be accommodated by digital filters, digital matched filters preferably implemented by DSPs or CPUs may be used as desired. It is also noted that other hardware forms of transversal filters may be used as desired. Also, a greater or lesser number of matched filters may be used, as desired. The filters $F_0$–$F_{15}$ preferably use pipelining for increased efficiency. Thus, the matched filter bank of the present invention uses both pipelining and parallelism for increased speed.

Figure 1B:
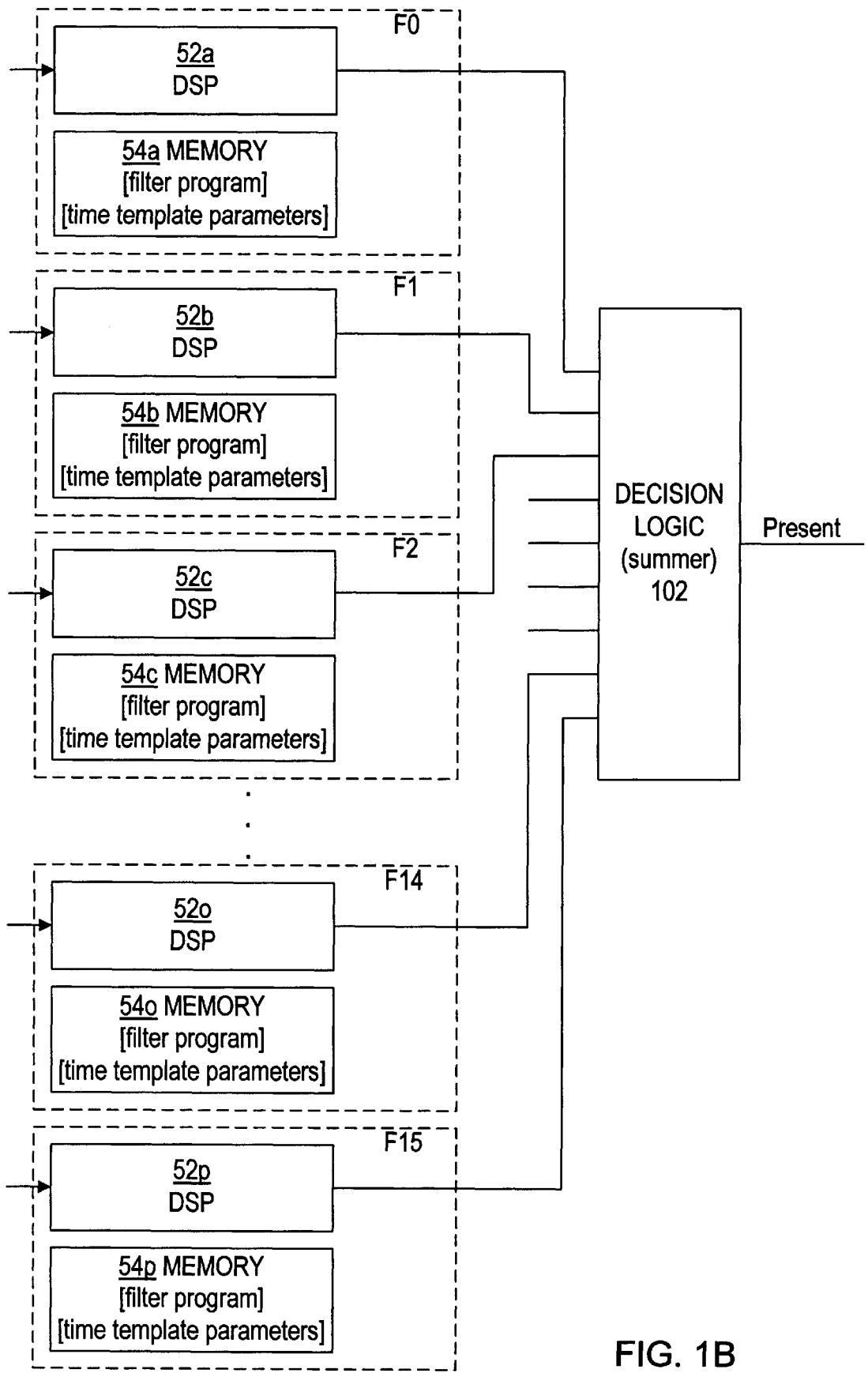
FIG. 1B is a block diagram illustrating a plurality of DSPs and corresponding memories used to implement the matched filter bank of the present invention.
Figure 1C:
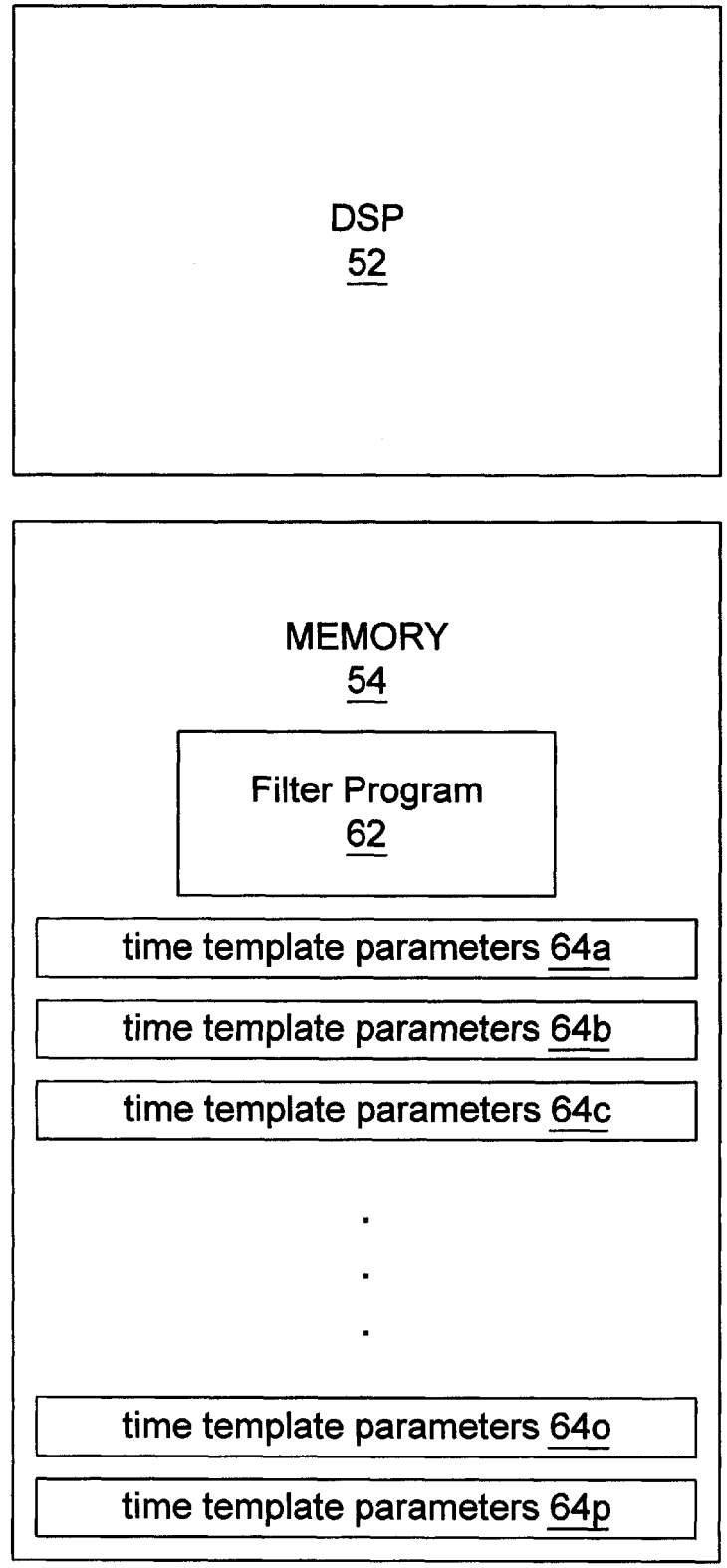
FIG. 1C is a block diagram illustrating a single DSP and corresponding memory used to implement the matched filter bank of the present invention.

FIGS. 1B and 1C illustrate embodiments of a filter bank for detecting dispersed broadband signals according to the present invention. Broadly speaking, a DSP implementation of the invention comprises at least one digital signal processor (DSP) 52 and at least one memory 54. The DSP 52 includes an input which receives signals. The memory 54 is coupled to the DSP 52 and stores code and data used by the DSP 52. The memory 54 stores a program 62 executable by the DSP 52 to perform a filter function, preferably a matched filter function. Since program code used to implement a matched filter function on a DSP is well known to those skilled in the art, details of this implementation are omitted for simplicity.

The memory 54 also stores a plurality of different sets of time template parameters, e.g., 64A–64P, wherein each of the plurality of different sets of time template parameters corresponds to a respective time template. The number of different sets of time template parameters corresponds to the number of different time templates, i.e., the number of different filters. In the preferred embodiment, 16 different time templates are used, although a greater or lesser number of time templates, and a corresponding greater or lesser number of sets of time template parameters, may be used. A set of time template parameters preferably comprises a plurality of samples of the respective time template. The number of samples can vary depending on the application and the memory and processing available.

As discussed further below, for a signal whose frequency content monotonically increases with time, each of the different sets of time template parameters is generated from the time template equation:

$$w_k(t)=A(t)\cos\{2\pi(f_\infty t-2\sqrt{Kt})\}$$

where A(t) is an amplitude; K is the curvature constant for the dispersed broadband signal; and the instantaneous frequency of the dispersed broadband signal asymptotically converges to $f\infty$. The value K is preferably different for each of the different sets of time template parameters, thus producing different time templates used in the matched filter comparisons.

For a signal whose frequency content monotonically decreases with time, each of the different sets of time template parameters is generated from the time template equation:

$$w_k(t)=A(t)\cos\{2\pi(2\sqrt{Kt})\}$$

where A(t) is an amplitude and K is the curvature constant for the dispersed broadband signal. The value K is preferably different for each of the different sets of time template parameters, thus producing different time templates used in the matched filter comparisons.

The DSP 52 executes the filter function code 62 stored in the memory 54 to perform the filter function using each of the plurality of different sets of time template parameters 64A–64P. In other words, for a sample of the received signal, the DSP 52 executes the filter function code 62 stored in the memory 54 with each set of time template parameters 64A–64P. Execution of the filter function code 62 using each of the different sets of time template parameters 64A–64P causes the DSP 52 to compare the received signals with each of the respective time templates. The DSP 52 then generates a signal indicative of the presence of the dispersed broadband signal based on these comparisons.

In the embodiment shown in FIG. 1B, 16 digital signal processors (DSPs) 52A–52P are used to implement the filters $F_0$–$F_{15}$. In other words, in the embodiment of FIG. 1B the 16 filters $F_0$–$F_{15}$ comprise 16 DSPs 52A–52P and corresponding 16 memories 54A–54P, i.e., each filter is implemented by a DSP 52 and a memory 54.

Each of the memories 54A–54P stores code and data used by its respective DSP 52A–52P. As shown, each of the memories 54A–54P stores a program 62 executable by the respective DSP 52A–52P to perform a filter function. Each of the memories 54A–54P also stores a respective set of time template parameters 64x, wherein each respective set of time template parameters corresponds to a respective time template. More particularly, each of the plurality of different sets of time template parameters 64A–64P corresponds to a form of a time template based on a single time template equation.

It is noted that a single memory 54 may be used for each of the DSPs 52A–52P, depending on the required processing speed. In this embodiment, the single memory 54 stores code and data used by all of the DSPs 52A–52P, i.e., the single memory 54 stores the filter function program 62 and each of the sets of time template parameters 64A –64P.

In the embodiment shown in FIG. 1C, only one digital signal processor (DSP) 52 is used to implement the filters $F_0$–$F_{15}$. In other words, in the embodiment of FIG. 1C each of the filters comprises a single programmable digital signal processor (DSP) 52 and a single memory 54. In this embodiment, the single memory 54 stores the program 62 executable by the DSP 52 to perform a filter function. The single memory 54 also stores the plurality of different sets of time template parameters 64A–64P corresponding to each of the filters being implemented. Each of the plurality of different sets of time template parameters 64A–64P corresponds to a respective time template based on a single time template equation.

Thus, in the embodiment of FIG. 1C, for each sample of the received signal, the DSP 52 executes the filter program 62 a plurality of times, preferably 16, for each of the filters being implemented. The DSP 52 uses a different set of time template parameters 64$x$ for each of the filters being implemented. Thus the DSP 52 operates to compare the sample of the received signal with each time template. The DSP 52 preferably implements the 16 filters substantially simultaneously, such as with multi-tasking or multi-threaded execution, preferably under the control of a real time operating system.

Figure 1D:
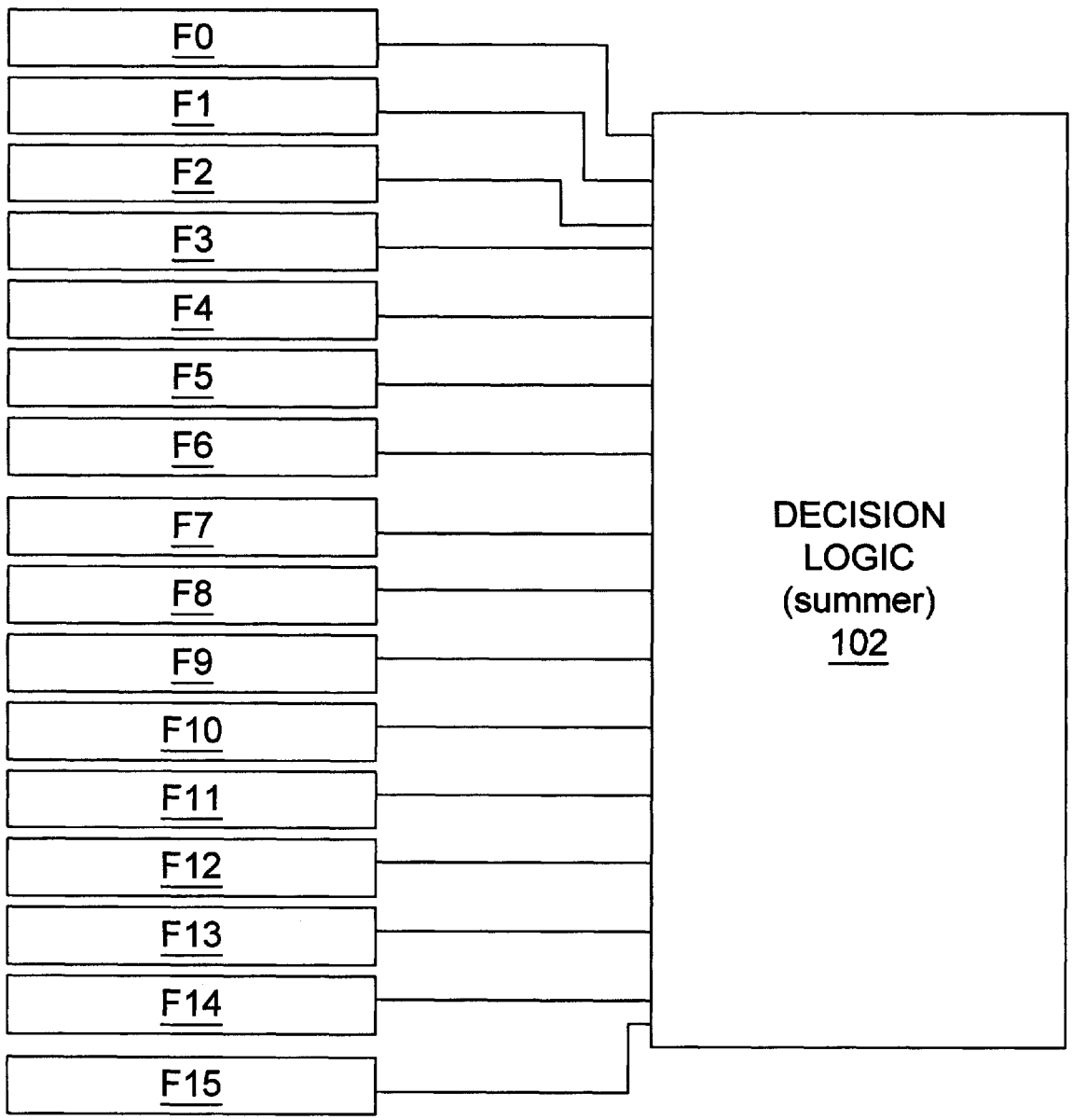
FIG. 1D block diagram illustrating an analog representation of the matched filter bank of the sent invention.

FIG. 1D is a block diagram of an analog implementation of a matched filter bank. As shown, this embodiment includes 16 analog matched filters which receive the signal and perform a matched filter operation. Each analog matched filter is configured with a different time template, and thus each analog matched filter has a different structure depending on the time template.

Since the design and construction of analog and digital matched filters is well known in the art, details of their construction are omitted for simplicity. For information on the design of analog and digital matched filters, please see Bernard Sklar, *Digital Communications,* Prentice Hall 1988, which is hereby incorporated by reference in its entirety. Please also see Parks and Burrus, *Digital Filter Design*, John Wiley & Sons, 1987 which is also incorporated by reference in its entirety.

Referring again to FIG. 1A, the mathematical representation of each of the filters is used to explain the operation of the filters. Each of the matched filters $F_0$–$F_{15}$ receives the broadband signal x(t), which comprises the signal s(t) of interest which has become heavily dispersed or corrupted by transmission through an ionized gas or the ionosphere. Each of the matched filters $F_0$–$F_{15}$ compares the dispersed broadband signal x(t) with a form of a robust time template $w_K(t)$ that has been designed to approximate the signals of interest. Each matched filter receives and uses a different time template, i.e., a different set of time template parameters. The different time templates are preferably based on a single time template equation, varying according to one or more variables.

As shown, each of the matched filters multiplies the received broadband signal x(t) with the respective time template, and then an integration is performed. The comparison preferably uses correlation techniques where the received signal x(t) and the time template $w_K(t)$ are correlated and the result is compared against a threshold value τ. Each of the analog matched filters $F_0$–$F_{15}$ generates a signal indicative of the presence of the dispersed broadband signal. If the result of the correlation of a matched filter is greater than the threshold value τ, then the output of the respective filter is a 1 value, and the signal of interest x(t) is determined to be present. Each of the indicating signals generated by the filters $F_0$–$F_{15}$ are provided to decision logic 102, preferably a summer, which produces an output signal that indicates whether the dispersed broadband signal has been received. The decision logic 102 indicates that the dispersed broadband signal has been received if one or more of the matched filters $F_0$–$F_{15}$ detect the presence of the dispersed broadband signal.

The number of time templates used determines the number of matched filters $F_0$–$F_{15}$. The number of different time templates used can be varied depending upon the amount of granularity desired. Thus, a greater number of varying time templates and corresponding matched filters can be used to provide improved detection of signals of interest. In the preferred embodiment, 16 matched filters with time templates $w_K(t)$ varying uniformly across a range were found to provide sufficient detection. The equation for the time template $w_K(t)$ is preferably:

$$w_k(t) = \cos\{2\pi(f_\infty t - 2\sqrt{Kt})\}\left\{U\left(t - \frac{K}{(f_\infty - f_0)^2}\right) - U\left(t - \frac{K}{(f_\infty - f_s/2)^2}\right)\right\}$$

where $f_s$ denotes the sampling frequency, which is twice the highest frequency contained in x(t); K is the curvature constant for the chirp; $f_0$ is the start frequency; and the instantaneous frequency asymptotically converges to $f\infty$, which is close to the mixer frequency, and is set by the minimum transmitted frequency in this ionospheric path. This time template equation is designed to detect chirp signals whose frequency content monotonically increases with time. As discussed below, a different time template is preferably used to detect chirp signals whose frequency content monotonically decreases with time.

The K value of the time template for each of the filters preferably varies. In the preferred embodiment, K varies from 10 to 75 MHz in 5 MHz increments. The τ value used in each of the matched filters to determine if the broadband signal has been received is based on the hardware implementation and the amount of background noise, i.e., the hardware device noise and the background noise. In the preferred embodiment, τ is several times larger than the standard deviation of the background noise, where the value is determined based on a trade-off between the probabilities of false alarms and missed detections. In one embodiment, τ is set to five times the standard deviation of the background noise.

The time template $w_K(t)$ is derived as follows. The signal of interest is referred to as s(t), the impulse response of the plasma or ionized gas is h(t), and the received signal x(t) can be modeled as s(t)*h(t), i.e., the signal s(t) convolved with the impulse response of the ionized gas h(t). Since s(t) is broadband (all pass), the frequency response of the received signal is $$X(f)=S(f)H(f) \approx C\ H(f),$$

where C denotes a real-valued constant. The above equation shows that due to the assumed impulsive nature of s(t), x(t) tends to the transfer function h(t). First, it is noted that the impulse response h(t) of the plasma or ionized gas can be modeled as a non-linear chirp function. A chirp function is a signal function whose frequencies monotonically increase or decrease with time. As one aspect of the present invention, it has also been discovered that the signal x(t) can be modeled as a chirp-type function, even though the signal s(t) necessarily varies from case to case. Accordingly, the signal x(t) is better recognized using the joint time-frequency domain than either the time domain or the frequency domain alone. However, for most applications, detection of the signal of interest in the joint time-frequency domain in real time is impractical due to the tremendous amount of signal processing required.

Therefore, the system of the present invention utilizes a robust time template in the time domain, which is used in the matched filter bank for the real time detection of dispersed broadband signals. Although the received dispersed broadband signal x(t) is in general a chirp-type function, the rate of change of frequency content and bandwidth generally varies dramatically, and thus it has been difficult to develop a robust template to match x(t) in either the time or frequency domain alone. However, the present invention has solved this problem and has developed a robust time domain template which can be used to accurately detect signals of interest in real time.

Figure 2:
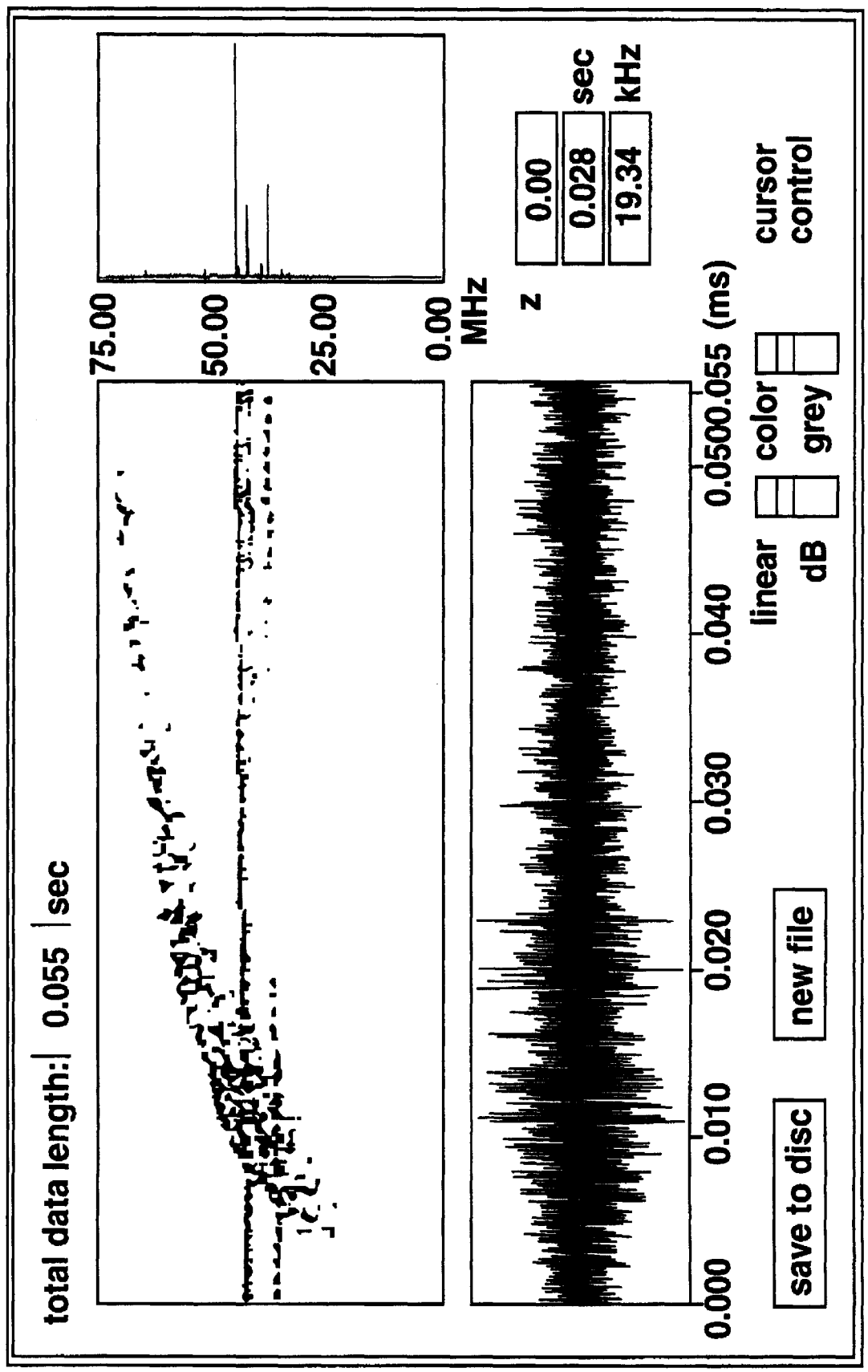
FIG. 2 illustrates a received time domain signal x(t), the power spectrum of the signal x(t), and a time frequency representation of the signal x(t)

Referring now to FIG. 2, the joint time-frequency representation is powerful in analyzing a signal whose frequency contents vary in time (e.g., the chirp signal), because it characterizes the signal in time and frequency simultaneously. FIG. 2 illustrates real time data samples of a chirp signal, the corresponding power spectrum of the real time data samples, and the joint time-frequency representation of the real time data samples. The data samples of FIG. 2 were transcribed by the DOE Alexis/Blackbeard satellite now in orbit. The bottom plot of FIG. 2 illustrates a time waveform of the data samples which appears featureless and similar to white noise. The plot on the right side of FIG. 2 is a traditional power spectrum of the time waveform which is dominated by strong radio carrier signals. The middle plot illustrates the joint time-frequency representation of the signal, which clearly displays one non-linear "chirp" signal. While noise tends to evenly spread out in the entire time-frequency space, the energy of the chirp type signal is shown clearly in the joint-time frequency domain. Consequently, the SNR of a chirp-type signal is significantly improved in the joint time-frequency domain. Therefore, while the time waveform appears as typical white noise and the power spectrum is dominated by strong radio carrier signals, the frequency varying pattern of a non-linear chirp signal is clearly seen in the joint time-frequency domain.

For most applications, such as radio astronomy and radio physics, it is currently impractical to perform real time detection (or pattern recognition) of dispersed broadband signals in the joint time-frequency domain. As discussed in the background section, for broadband signals having a range of 75 MHz, the sampling rate is as high as 150 MHz (twice the 75 MHz bandwidth). As a result, the computation burden associated with detecting signals using the joint time-frequency transformation is beyond what is offered by currently available technology. Even with optimal algorithms, the operation count is of the order Nlog(N), where N is the number of frequency bins and typically 128. The implied computational rate would be 1,000 floating point operations/6 nanoseconds or 150 Gigaflop. Therefore, the present invention uses a time domain matched filter which is optimum in the sense of maximizing SNR and feasible for analog implementation.

It is noted that time domain matched filters are commonly employed in radar signal processing for linear chirp with known rates, where the filter is implemented in surface acoustic wave (SAW) or acoustic-optic (A-O) technologies. However, in the more general case where the chirp rate is non-linear and unknown, a major problem in using a time domain matched filter is determining or selecting the proper time template. Although the received signals x(t) are in general chirp type functions, the changing rate of this frequency and bandwidth could vary dramatically. The frequency trajectory (df/dt) of the signal x(t) can vary by a factor of 1000, depending on test frequency and ionosphere or ionized gas, while the instantaneous bandwidth can vary by a factor of 10 in the observed x(t). Therefore, it is difficult to develop a robust time template from the time or frequency domain alone to match the received signal x(t). The present invention utilizes the joint time-frequency representation to develop a robust time template. The present invention utilizes a novel system and method for selecting the time template, and this system and method is described below.

The time domain template is assumed to take the form of $$w(t)=A(t)\cos\{2\pi\phi(t)\}.$$

First, based on joint time-frequency analysis, a general form for the instantaneous frequency function of x(t) is derived. Then, the phase $\phi(t)$ is computed in the corresponding time domain template. Simulations indicate that all x(t) encountered in real applications are perfectly matched by a small group of time templates, and thus the present invention uses parallel matched filter banks for detection. The system and method of the present invention is important in detecting signals traveling through plasma in radio physics as well as signals traveling through interstellar plasma in radio astronomy research. The template design methodology of the present invention is also useful for the detection of any type of signal whose frequency content varies with time, including such diverse applications as geophysical research, acoustical signal analysis, and the natural sciences, among others. It is noted that the actual signal s(t) is not required to have a frequency content which varies with time and, on the contrary, will generally not have a frequency content which varies with time. However, if a signal s(t) travels through a media, wherein the media transforms the signal s(t) into a signal x(t) whose frequency content varies with time, then the present invention may be used to detect this signal. The template design methodology of the present invention can be used whenever the dispersed signal behavior follows a derivable or testable parametric rule.

Flowchart Diagram

Figure 3:
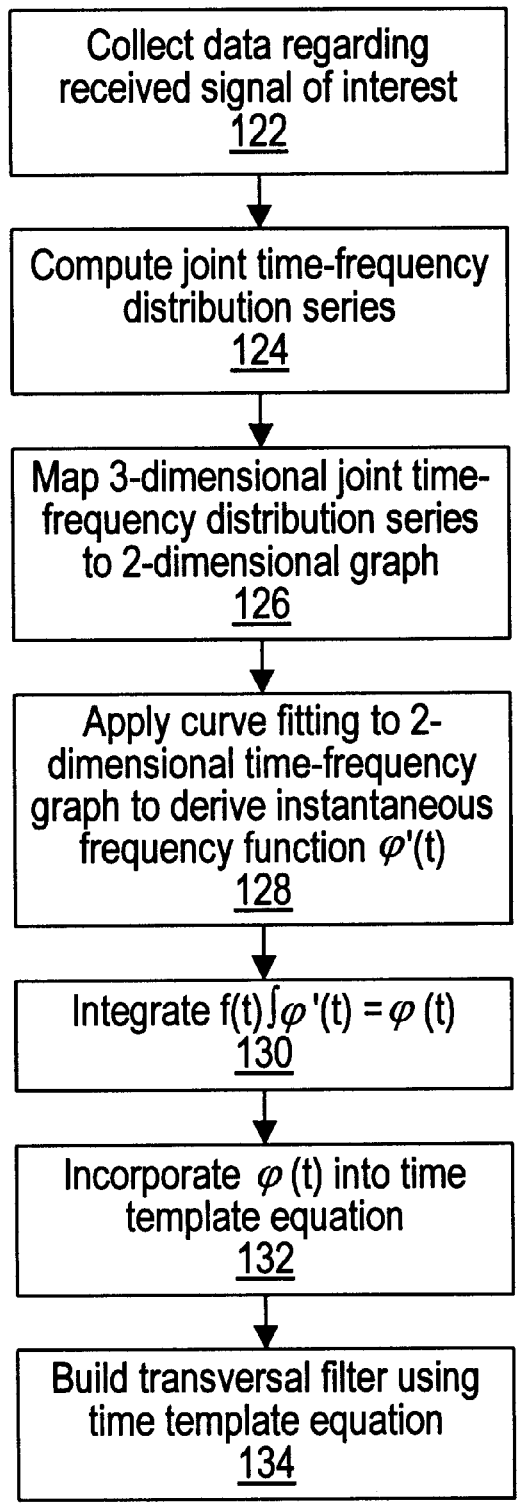
FIG. 3 is a flowchart diagram illustrating operation of a method for determining a robust time template for use in transversal filters or matched filters according to the present invention.

Referring now to FIG. 3, a flowchart diagram illustrating operation of a method for deriving a robust time template for use in transversal filters or matched filters for detecting a signal whose frequency content varies with time is shown. This method is used to derive a robust time template for the matched filter bank of FIG. 1 of the present invention. As shown in step 122, data is first collected regarding the received signal of interest. In order to build one or more matched filters for detecting a signal of interest, it is important to at least have some partial knowledge about the shape of the signal. Thus, the method of the present invention assumes that there is an ensemble or small set of representative signals of the desired type which are available to analyze. One method used to obtain the necessary data is to collect a large sample of received data, find the signals of interest and then use these signals of interest as the collected data. In the present embodiment, the data was collected from the DOE Blackbeard Satellite and obtained from Los Alamos National Laboratory.

Joint Time-Frequency Representation

Once sufficient data has been collected regarding a received signal of interest in step 122, in step 124 a joint time-frequency representation is generated to describe these signals. In the preferred embodiment the time-frequency distribution series (TFDS), otherwise known as the Gabor spectrogram, is used to compute a representation of these signals in the joint time-frequency domain. It is noted that a Wigner-Ville distribution is not used because of the severe cross term interference. The WVD is discussed in J. Ville, "Theorie et applications de la notion de signal analytique," (in French) *Cables et Transmission*, vol.2, 1948, pp.61–74; and E. P. Wigner, "On the Quantum Correction for Thermodynamic Equilibrium," *Phys. Rev.*, vol.40, 1932, pp.749; and T. A. C. M. Claasen and W. F. G. MecklenbrŠuker, "The Wigner Distribution—a Tool for Time-Frequency signal Analysis," *Philips J. Res.*, vol.35, 1980, pp.217–250, pp.276–300, pp.1067–1072 which are all hereby incorporated by reference in their entirety.

As mentioned earlier, the received signal x(t) is a non-linear chirp type signal, whose frequency content changes with time. Therefore, this signal is better recognized in the joint time-frequency domain rather than in the time or frequency domain alone. As mentioned above, the time-frequency distribution series (TFDS), also known as the Gabor spectrogram, is preferably used for the purpose of instantaneous frequency estimation. For more information on the joint time-frequency representation, please see L. Cohen, "Time-Frequency distribution—A Review," *Proceedings of the IEEE*, vol.77, No.7, July 1989, pp.941–981, which is hereby incorporated by reference in its entirety.

For a signal $z(t)=A(t)\exp\{i2\pi\phi(t)\}$, the instantaneous frequency is traditionally defined as the first derivative of phase function $\phi'(t)$, which describes how frequency contents change in time. For a joint time-frequency representation P(t,f), the first conditional moment is $$\langle f \rangle_t = \frac{\int f P(t,f) df}{\int P(t,f) df} \quad (3)$$

which normally is considered as the mean instantaneous frequency. It is noted that unless otherwise indicated, the limits of integration extend from − to . In computing a robust time template, it is desired that the mean instantaneous frequency computed by the joint time-frequency representation be equal to the signal instantaneous frequency, i.e., $$\langle f \rangle_t = \phi'(t).$$

1. Short Time Fourier Transform

One of most popular joint time-frequency representations is the short-time Fourier transform (STFT) defined as $$STFT(t,f) = \int z(\tau) g(\tau-t) \exp\{-i2f\tau\} d\tau,$$

where $g(t)=A_g(t) \exp\{i2\pi\phi_g(t)\}$ is a window function. If P(t,f) is replaced by $|STFT(t,f)|^2$ in the first conditional moment equation above, then $$\langle f \rangle_t = \frac{\int A^2(\tau) A_g^2(\tau-t) \phi'(\tau) d\tau}{\int A^2(\tau) A_g^2(\tau-t) d\tau} + \frac{\int A^2(\tau) A_g^2(\tau-t) \phi_g'(\tau) d\tau}{\int A^2(\tau) A_g^2(\tau-t) d\tau}. \quad (4)$$

The equation immediately above shows that the mean instantaneous frequency of $|STFT(t,f)|^2$ is subject to the selection of the window function g(t). In general, $\langle f \rangle_t \neq \phi'(t)$ unless the window length is very narrow, say $A_g(t) \approx \delta(t)$. In this case, however, the frequency resolution will be degraded significantly compared to the extended time windows normally employed.

For many cases the instantaneous frequency of practical window functions $\phi_g'(t)$ is close to DC. In other words, $\phi_g'(t) \approx 0$. In this case, if the window length is selected to be much smaller than the length of the analysis data, then the difference between $\langle f \rangle_t$ and $\phi'(t)$ is found to be negligible. In particular, because of the simplicity and efficiency of implementation, the STFT can be an expedient estimator of instantaneous frequency for many applications. However, the STFT is not an ideal representation for tracking the instantaneous frequency $\phi'(t)$ because the use of different windows leads to different "instantaneous frequency" trajectories.

2. Time Frequency Distribution Series

Therefore, the present invention uses the time frequency distribution series (TFDS), also known as Gabor spectrogram, to obtain a joint time-frequency representation of the signal x(t). The TFDS is computed by applying the Gabor expansion and the WVD together to decompose a signal as a linear combination of two-dimensional (time and frequency) harmonics series, which is referred to as the time-frequency distribution series (TFDS). For more information on the Gabor expansion, please see D. Gabor, "Theory of Communication," *J. IEE* (London), vol.93, No. III, November 1946, pp.429–457 which is hereby incorporated by reference. For more information on the Gabor Spectrogram or the TFDS, please see S. Qian and D. Chen, "Decomposition of the Wigner-Ville Distribution and Time-Frequency Distribution Series" to appear in *IEEE Trans. on Signal Processing*, October 1994. Please see also U.S. application Ser. No. 07/851,725 filed Mar. 17, 1992, titled "Method for Time-Varying Spectrum Analysis," which was allowed on Apr. 13, 1994 and is now U.S. Pat. No. 5,353,233, whose inventors are Shie Qian and Dapong Chen, which is hereby incorporated by reference.

The TFDS can be represented as follows:

$$TFDS_D(t,f) = \sum_{d=0}^{D} P_d(t,f), \quad (5)$$

where the subscript d is the order of the TFDS term, which indicates the degree of oscillation. Higher values of d give stronger oscillatory behavior in the TFDS, but also include less energy. The majority of signal energy is contained in a few lower order terms $P_d(t,f)$. Higher harmonic terms possess less signal energy and cause cross-term interference. On the other hand, they significantly improve resolution of the joint time-frequency representation. When D=0, $TFDS_0(t,f)=P_0(t,f)$ is non-negative and similar to the STFT using a Gaussian window (which has low resolution). As higher harmonics terms are included (increasing D), the resolution of $TFDS_D(t,f)$ increases, but cross-term interference also becomes more severe. For $D \to \infty$, $TFDS_\infty(t,f)$ converges to the Wigner-Ville distribution. By adjusting the order of TFDS, one is able to effectively balance the cross-term interference and resolution for each problem of interest. Factors which influence the order selection are the number of simultaneous frequencies present, and the signal to random noise ratio in the time series.

It has been shown both analytically and numerically that the TFDS has much better joint time-frequency resolution than the STFT. While maintaining a good frequency resolution, the mean instantaneous frequency computed by TFDS can be very close to the signal instantaneous frequency.

It is also noted that the mean instantaneous frequency leads to a meaningful result only for monotone and noiseless signals. This equation cannot be directly used to estimate the instantaneous frequency in most real applications. For instance, if the analyzed signal contains two components, $s_1(t)$ and $s_2(t)$, their instantaneous frequencies are $\phi'_1(t)$ and $\phi'_2(t)$ respectively. Instead of giving two separate real instantaneous frequencies, the answer of the above equation will most likely be $\{\phi'_1(t)+\phi'_2(t)\}/2$, which is not the desired result.

Although the mean instantaneous frequency does not give correct instantaneous frequencies in most applications, the trajectory of the joint time-frequency representation does characterize signal time-varying behavior, as long as the different components are distinguishable. It is noted that the trajectory of the joint time-frequency representation is always a very good approximation of $\phi'(t)$, regardless of whether the signal is monotone or has multiple components. Therefore, a curve fitting technique is used according to the present invention to derive a general instantaneous frequency function.

Therefore, in step 124, the joint time-frequency distribution series (TFDS) is computed for the received signal x(t). For a good estimation, the joint time-frequency representation must have:

(1) minimum cross-term interference, thereby being able to identify non-linear chirp signals in a noise environment;

(2) a trajectory closer to the instantaneous frequencies.

The short-time Fourier transform and Wigner-Ville distribution do not satisfy these two requirements simultaneously. The low order time-frequency distribution series is found to suitably compromise time-frequency resolution and cross-term interference problems. In all cases, $TFDS_2(t,f)$ is chosen. Although the original SNR is less than zero dB, the chirp patterns are obvious in the joint time-frequency representation. As noted above, the WVD essentially does not work in this application, because in the WVD, all chirp patterns completely disappear due to the presence of noise. Thus, as discussed above, the $TFDS_D(t,f)$ provides a very good approximation of the instantaneous frequency function $\phi'(t)$, while also having limited cross-term interference. More exactly, the trajectory of the TFDS is a good approximation of the instantaneous frequency function $\phi'(t)$.

Figure 4:
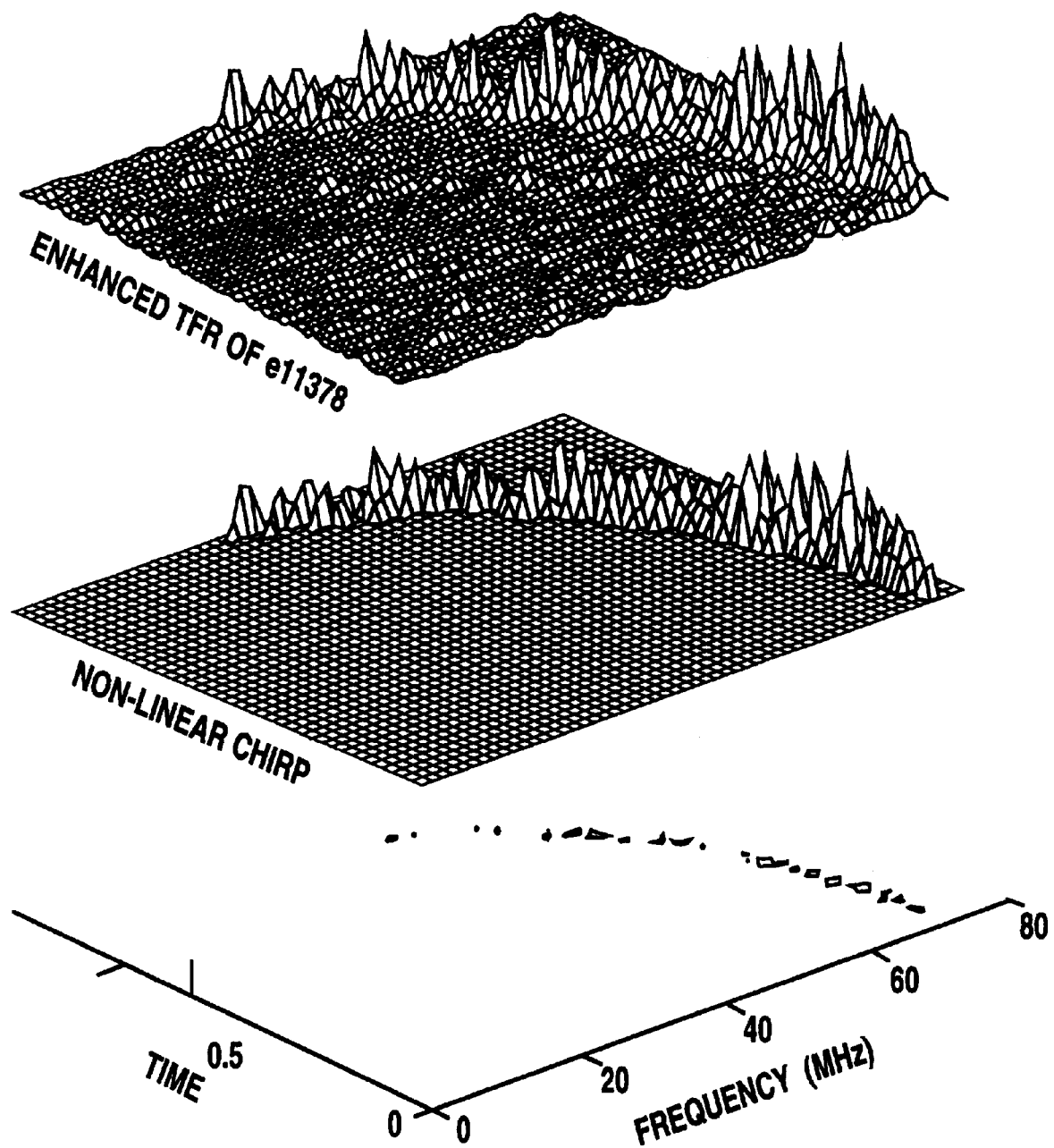
FIG. 4 depicts a procedure for computing instantaneous frequency based on a signal joint time-frequency representation.
Figure 5:
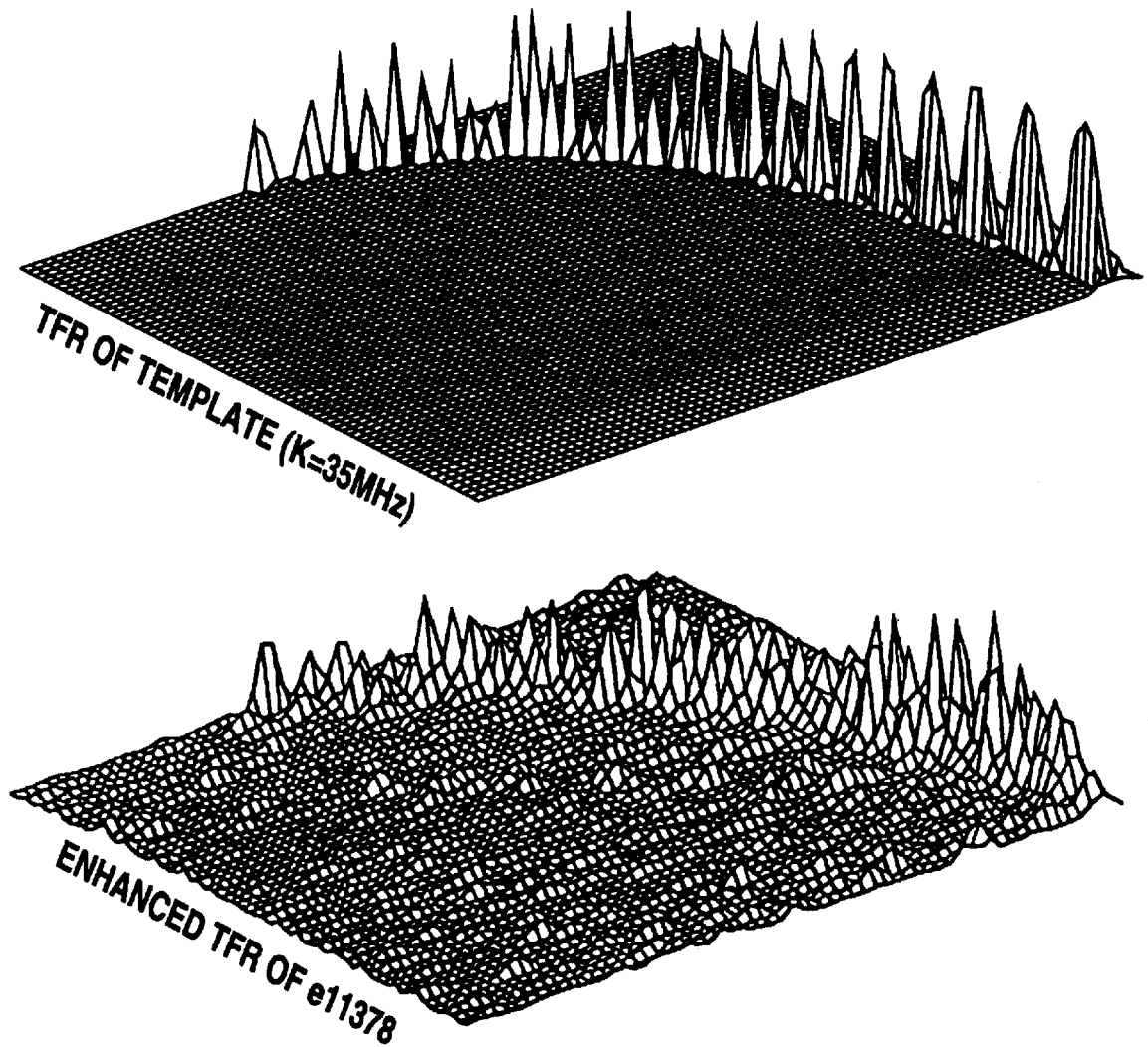
FIG. 5 illustrates the received signal x(t) containing the signal of interest and the matching time template.

In step 126, the portions of the joint time-frequency plot of interest (such as those which correspond to non-linear chirp functions) are marked and projected on the time-frequency plane, thereby reducing the modified $P(t,f)$ to a multivalued function(t). This involves estimating the instantaneous frequency and is illustrated in FIG. 4. This reduces the modified $TFDS_2(t,f)$ ("noiseless" $TFDS_2(t,f)$) to a multivalued function $f(t)$. As shown in the bottom plot of FIG. 4, the multivalued function f(t) will generally have more than one frequency component at a particular time, and vice versa. In other words, step 126 involves mapping the three dimensional joint time-frequency distribution series to a 2-dimensional graph of a multivalved function, as shown most clearly in FIG. 4. In the preferred embodiment, a simple thresholding process is used which discards values below a certain limit. Other methods may be used to map the 3-D TFDS to a 2-dimensional plot, as desired. In step 128 a curve fitting technique is applied to derive a general instantaneous frequency function $\phi'(t)$, i.e., to derive a parametric model $\phi'(t)$ to fit all possible $f(t)$. In the preferred embodiment, the Levenberg-Marquardt method is used to curve fit the trajectory of the $TFDS_2(t,f)$, using the LabVIEW graphical programming environment from National Instruments Corporation. FIG. 5 illustrates a received signal x(t), referred to as e11378 (bottom), and the corresponding trajectory.

At this point it is noted that the Blackbeard satellite data is inverted in frequency content, as a result of being a lower sideband mixing product with a local oscillator. While this inversion is easily reversed by numerically multiplying the data with another carrier function, and low pass filtering, there is no reason to do so. The method of the present invention can just as easily be used to match the inverted behavior as the non-inverted, since a physical model is not explicitly used. Therefore, in the preferred embodiment, the time template is developed based entirely on the inverted chirp functions transcribed by the Blackbeard satellite. In an alternate embodiment, described below, the time template used is based on the original non-invented chirp signals whose frequency content monotonically decreases with time.

By testing several forms, including a cubic and exponential curve, the best formula to describe the band limited chirp trajectory is found as $$t = t_0 + \frac{K}{[f_\infty - \phi'(t)]^2}, \qquad f_0 \le \phi'(t) < f_\infty$$

where $t_0$ is the arrival time of the non-linear chirp signal, and K is the curvature constant for the chirp. $\phi'(t)$ asymptotically converges to $f\infty$, which is close to the mixer frequency, and is set by the minimum transmitted frequency in this ionospheric path. It has been discovered according to the present invention that the above equation with different parameter settings fits all non-linear chirp patterns encountered in real applications.

Without loss of generality, let $t_0=0$. Then the instantaneous frequency is $$\phi'(t) = f_\infty - \sqrt{\frac{K}{t}}$$

where $f_0 \le \phi'(t) f_\infty$. Integrating $\phi'(t)$ along t in step 130 yields $$\phi(t) = f_\infty t - 2\sqrt{Kt}.$$

Finally, substituting this equation into the form of the time domain template in step 132 gives:

$$w_k(t) = \cos\{2\pi(f_\infty t - 2\sqrt{Kt})\}\left\{U\left(t - \frac{K}{(f_\infty - f_0)^2}\right) - U\left(t - \frac{K}{(f_\infty - f_s/2)^2}\right)\right\},$$

where $f_s$ denotes the sampling frequency, which is twice the highest frequency contained in x(t) and $f_0$ is the start frequency.

U(t) denotes the unit step function, which is used to generate the amplitude function as $$A(t) = U\left[t - \frac{K}{(f_\infty - f_0)^2}\right] - U\left[t - \frac{K}{(f_\infty - f_s/2)^2}\right],$$

This ensures that the time template $w_k(t)$ sweeps from $f_0$ to $f_s/2$. Assumption of unit amplitude gives minimum instantaneous bandwidth, and is best applied when no a priori knowledge of spectral content for the original x(t) is available.

For the most general signal detector, the time template is preferably as robust as possible, which requires that the amplitude A(t) have properties common to all signals of interest. In other words, an instantaneous bandwidth function is selected that best matches the entire ensemble of signal bandwidths, and does not introduce unwanted constraints in the coherence of A(t) during the chirp. At present the amplitude A(t) used above allows adequate recognition of the SNR for all signals tested. However, more complex forms of the amplitude A(t) may be used as desired.

Simulations

Since one object of the present invention is to generate an automatic process for trans-ionospheric chirp detection, the filter bank of the preferred embodiment was tested against an ensemble of actual data recorded by the DOE radio science experiment, Blackbeard, launched by a Pegasus vehicle into an 850 km orbit on October 1993. The details of this experimental wideband radio receiver have been reported elsewhere, and it is interesting to note the parameters relevant from a signal processing point of view. In all cases the sample rate is 150 Megasamples/second, the mixer frequency which inverts the spectrum is 100 MHz, so that signal frequencies at 100 MHz are translated to DC, while signals at the 25 MHz lower bandwidth limit are translated to 75 MHz apparent frequency in the data records. The fundamental quantization is 8 bits, giving an effective dynamic range for most frequencies of about 40 dB. $f_0$ is set to 0 and $f\infty$ is set to 94 MHz (mixer frequency −6 MHz minimum ionospheric frequency). It is noted that Blackbeard has only a simple level threshold trigger, and cannot resolve less than 4 Megabyte record lengths. Therefore a major success of the operation of the present invention is the demonstration in post-processing software of the ability to sort chirps out of the enormous records of blank signals recorded by the satellite.

To perform the tests, the cross correlation of x(t) and $w_K(t)$ is taken, preferably using sixteen different K (10, 15, 20, ..., 75 MHz), and the correlation window is moved in block steps through the 1 to 4 Megasample data lengths. In hardware each K value is preferably represented by a separate, parallel cross correlation processor or filter, and the signal streams through each continuous analog correlation processor. A total of ten Blackbeard files were tested, with 100% recognition demonstrated, based on a simple level threshold trigger applied to the smoothed and rectified cross-correlation output. Two examples of the data are graphically shown in FIGS. 6 and 7, with the output of the successful cross correlation filter. These files are a variety of natural lightning signals and pulse stimulation by a VHF impulse generator situated at Los Alamos.

Figure 6:
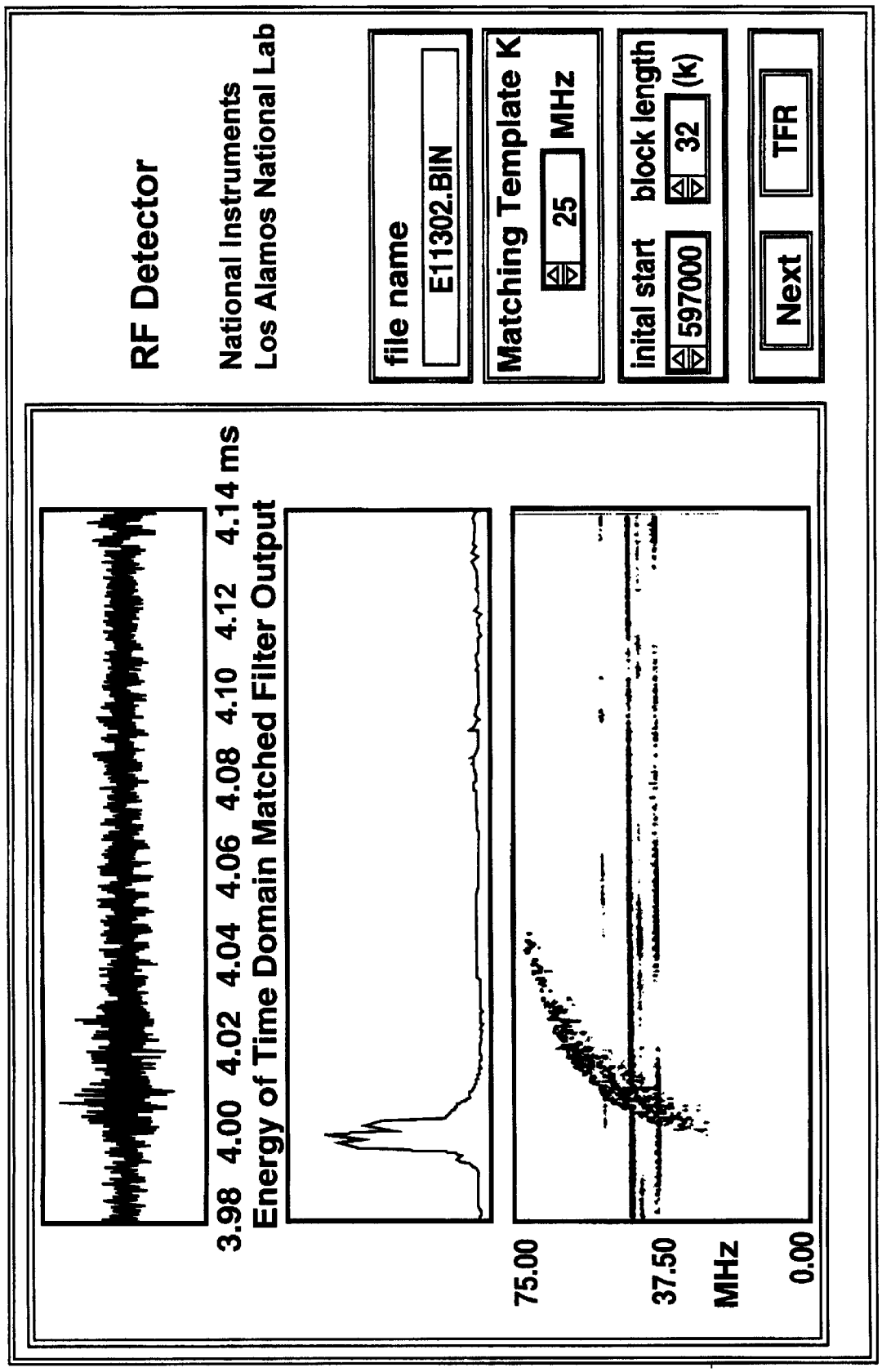
FIGS. 6–7 illustrate processing of a chirp signal from an ensemble of signals to detect signals of interest according to the present invention.

FIG. 6 illustrates the result of processing Chirp #e1302 from the ensemble. This is a naturally occurring signal assumed to be due to atmospheric discharge or lightning. The top plot is the time waveform, which resembles incoherent noise and where the region of interest normally lasts less than one millisecond. The middle plot is squared matched filter outputs. The bottom portion is the corresponding intensity plot of $TFDS_2(t, f)$. This record serves as an example of performance in a stronger signal domain, and shows the larger cross-correlation output obtained for such signal. In either case, there is no difficulty in detecting the recognition pulse output with very standard techniques.

Figure 7:
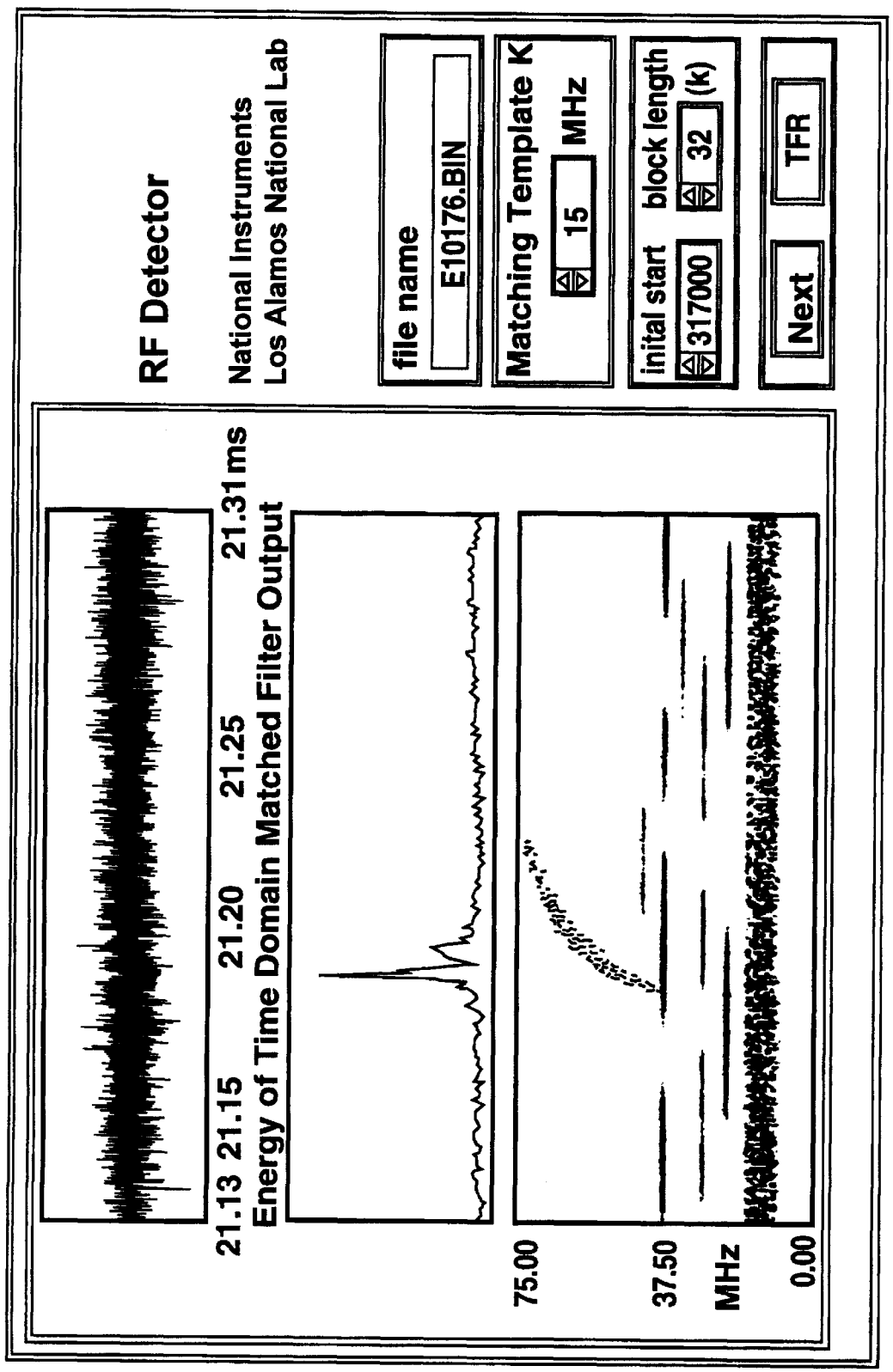

FIG. 7 is an example of chirp filter performance on a much weaker artificial signal from a Los Alamos pulser, satellite record #e10176. The chirp is barely distinguishable in the joint time-frequency domain, and has peak power less than 1/20 of peak interference. However, the output of the matched filter is still robust, with a peak/RMS SNR of at least 10. Using classical pulse detection theory, such an SNR implies a combined probability of error in detection of $10^{-7}$. This is more than adequate for most scientific work, indicating a successful detector has been synthesized.

By working with all of the data ensemble, and using a sparse set of K values, cross correlation outputs for all chirps were found to be as robust as FIGS. 6 and 7. This shows that all transionospheric signals collected can be detected by at least one $w_K(t)$, and implies that for typical ionospheric conditions, all chirp signals can detected by fewer than sixteen parallel matched filters. If the ionospheric density changes drastically, as from the peak to minimum of the sun spot cycle, a new set of chirps may need to be periodically changed in, but the largest simultaneous number needed appears to be 16.

Time Template Variations

As previously noted, the satellite data obtained from the Blackbeard satellite in step 122 is inverted in frequency content. The received signal x(t) is provided to the satellite and is transformed using a lower side mixer with a local oscillator. The remaining steps 124–134 are performed using this data, whose frequency content has been inverted. However, it is noted that the method described in FIG. 2 can also be used for the original, non-inverted data. If the method of FIG. 2 is used on non-inverted received signal data, the instantaneous frequency function is similar to the formula proposed by Massey below, except $f_B=0$.

$$T(f) = t_0 + \frac{1.343 \times 10^{-7} N_e}{f^2}\left(1 \pm \frac{f_B}{f}\right)$$

where $t_0$ is the hypothetical arrival time of the undispersed signal s(t), $N_e$ is the integral electron density along the propagation path, and $f_B$ is the electron cyclotron frequency calculated using component of B parallel to the path of propagation. For more information on this equation, please see Massey "Ionospheric Group Delay and Phase Including Refractive Effects," Los Alamos Report, LA-11878-MS. This instantaneous frequency function can be integrated and substituted into the equation $$\int f(T) dT$$

to obtain a different time template that can be used to match received signals x(t) of interest which have not been inverted in frequency content.

Using the methods described above, the time template for a non-inverted chirp signal, in this instance a chirp signal whose frequency content monotonically decreases with time, is determined as follows: The instantaneous frequency function is determined as $$\phi'(t) = \sqrt{\frac{K}{t}}$$

Thus φ(t) is determined as $$\phi(t) = 2\sqrt{Kt}$$

It is noted that this equation is similar to the φ(t) computed for chirp signals that have been inverted in frequency content, i.e., chirp signals whose frequency content monotically increases with time, $$\phi(t) = f_\infty t - 2\sqrt{Kt}$$

except that the mixer frequency $f_\infty$ is 0 and the sign of $2\sqrt{Kt}$ is positive instead of negative. Thus, for non-inverted chirp signals, i.e., chirp signals whose frequency content monotonically decreases with time, the time template is:

$$w_k(t) = A(t)\cos\{2\pi(2\sqrt{Kt})\}$$

The amplitude A(t) is preferably selected as $$A(t) = U\left[t - \frac{K}{f_0^2}\right] - U\left[t - \frac{K}{(f_s/2)^2}\right]$$

In an embodiment where it is desired to detect chirp signals whose frequency content monotonically decreases with time, various forms of the above time template equation for chirp signals whose frequency content monotonically decreases with time is used in the filter bank of FIG. 1. It is interesting to note that although Massey and the preferred embodiment of the invention use two different approaches, one from pure physics and the other from a signal processing perspective, to investigate the ionized channel, the results are similar for non-inverted data, thus indicating the operability of the invention.

Conclusion

Therefore, the present invention comprises one or more robust matched filters, employing a synthesized time template derived by joint time-frequency analysis, for detection of transionospheric and other non-linearly dispersed signals. A critical requirement is that the dispersion, and therefore the frequency trajectory, have a deterministic form suitable for description by a smooth functional form. Since this is manifestly the case for these signals, the resulting detector is optimum for maximizing SNR of the received signal in both random and coherent backgrounds. By demonstrating that a sparse set of K values adequately spans the observed space, the system of the present invention is suitable for analog implementation. The present invention is able to detect the dispersed or transionospheric signal in real time, using analog convolutional structures. Finally, the filter and time template design methodology of the present invention is very general, and can be applied to many other dispersed signal detection problems found in biological applications, medical acoustics, ultrasonic testing, and geophysics, among others.

Therefore, the present invention uses time-frequency representation techniques to derive a robust time template for detection of ionized signals. This robust time template is provided as an input to one or more matched filters. The resulting detector is not only optimum in the sense of maximizing SNR, but also is suitable for analog implementation. Therefore, it is possible to detect the transionospheric signal in real time. Moreover, the time template design methodology presented herein is rather general, which can be applied to other time-varying signal detection problems.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A system for detecting the presence of a dispersed broadband signal, comprising:

a filter bank comprising a plurality of filters, wherein each of said plurality of filters is configured with a different set of time template parameters corresponding to a respective time template, wherein each of the different sets of time template parameters is generated from the time template equation:

$$w_k(t) = \cos\{2\pi(f_\infty t - 2\sqrt{Kt})\}A(t)$$

where A(t) is an amplitude;

K is the curvature constant for the dispersed broadband signal; and the instantaneous frequency of the dispersed broadband signal asymptotically converges to $f\infty$;

wherein K is different for each of said different sets of time template parameters;

wherein each of said plurality of filters includes a first input which receives signals and compares said received signals with said respective time template and generates a signal indicative of the presence of the dispersed broadband signal.

2. The system of claim 1, wherein said amplitude A(t) is:

$$A(t) = \left\{U\left(t - \frac{K}{(f_\infty - f_0)^2}\right) - U\left(t - \frac{K}{(f_\infty - f_s/2)^2}\right)\right\}$$

where $f_0$ is a start frequency; and where $f_s$ is the sampling frequency.

3. The system of claim 1, wherein said value of K varies uniformly over a range of possible K values to match different possible variations of said dispersed broadband signal.

4. The system of claim 1, further comprising:

decision logic coupled to the outputs of each of said plurality of filters which determines if detection of the dispersed broadband signal has occurred in any of said filters and produces a signal indicative thereof.

5. The system of claim 1, wherein each of the different sets of time template parameters is generated from the time template equation:

$$w_k(t) = \cos\{2\pi(f_\infty t - 2\sqrt{Kt})\}\left\{U\left(t - \frac{K}{(f_\infty - f_0)^2}\right) - U\left(t - \frac{K}{(f_\infty - f_s/2)^2}\right)\right\}$$

where $f_0$ is a start frequency;

where $f_s$ is the sampling frequency;

where K is the curvature constant for the dispersed broadband signal; and the instantaneous frequency of the dispersed broadband signal asymptotically converges to $f\infty$.

6. The system of claim 1, wherein said plurality of filters comprise matched filters.

7. The system of claim 1, wherein said plurality of filters comprise at least one digital signal processor and at least one memory;

wherein said at least one memory stores code executable by the at least one digital signal processor to perform a filter function;

wherein said at least one memory stores a plurality of different sets of time template parameters corresponding to said plurality of filters;

wherein said at least one digital signal processor executes said code to perform said filter function using each of said plurality of different sets of time template parameters to compare said received signals with said respective time templates and generates a signal indicative of the presence of the dispersed broadband signal.

8. The system of claim 1, wherein said plurality of filters comprise at least one digital signal processor and at least one memory;

wherein said at least one memory stores code executable by the at least one digital signal processor to perform a filter function;

wherein said at least one memory stores a plurality of different sets of time template parameters corresponding to said plurality of filters;

wherein said at least one digital signal processor executes said code to perform said filter function using each of said plurality of different sets of time template parameters to compare said received signals with said respective time templates and generates a signal indicative of the presence of the dispersed broadband signal.

9. A system for detecting the presence of a dispersed broadband signal, comprising:

a filter bank comprising a plurality of filters, wherein each of said plurality of filters is configured with a different set of time template parameters corresponding to a respective time template, wherein each of the different sets of time template parameters is generated from the time template equation:

$$w_k(t) = \cos\{2\pi(2\sqrt{Kt})\}A(t)$$

where A(t) is an amplitude; and

K is the curvature constant for the dispersed broadband signal;

wherein K is different for each of said different sets of time template parameters;

wherein each of said plurality of filters includes a first input which receives signals and compares said received signals with said respective time template and generates a signal indicative of the presence of the dispersed broadband signal.

10. The system of claim 9, wherein said amplitude A(t) is:

$$A(t) = \left\{ U\left(t - \frac{K}{(f_0)^2}\right) - U\left(t - \frac{K}{(f_s/2)^2}\right) \right\}$$

where $f_0$ is a start frequency; and where $f_S$ is the sampling frequency.

11. The system of claim 9, wherein said value of K varies uniformly over a range of possible K values to match different possible variations of said dispersed broadband signal.

12. The system of claim 9, further comprising:

decision logic coupled to the outputs of each of said plurality of filters which determines if detection of the dispersed broadband signal has occurred in any of said filters and produces a signal indicative thereof.

13. The system of claim 9, wherein each of the different sets of time template parameters is generated from the time template equation:

$$w_k(t) = \cos\{2\pi 2\sqrt{Kt}\}\left\{U\left(t - \frac{K}{(f_0)^2}\right) - U\left(t - \frac{K}{(f_s/2)^2}\right)\right\}$$

where $f_0$ is a start frequency;

where $f_S$ is the sampling frequency; and where K is the curvature constant for the dispersed broadband signal.

14. The system of claim 9, wherein said plurality of filters comprise matched filters.

15. A system for detecting the presence of a dispersed broadband signal, comprising:

at least one digital signal processor, wherein the at least one digital signal processor includes an input which receives signals; and at least one memory coupled to the at least one digital signal processor storing code and data, wherein the at least one memory stores code executable by the at least one digital signal processor to perform a filter function, wherein the at least one memory stores a plurality of different sets of time template parameters, wherein each of said plurality of different sets of time template parameters corresponds to a respective time template, wherein each of the different sets of time template parameters is generated from the time template equation:

$$w_k(t) = \cos\{2\pi(f_\infty t - 2\sqrt{Kt})\}A(t)$$

where A(t) is an amplitude;

K is the curvature constant for the dispersed broadband signal; and the instantaneous frequency of the dispersed broadband signal asymptotically converges to $f\infty$;

wherein K is different for each of said different sets of time template parameters;

wherein said at least one digital signal processor executes said code to perform said filter function using each of said plurality of different sets of time template parameters to compare said received signals with said respective time templates and generates a signal indicative of the presence of the dispersed broadband signal.

16. The system of claim 15, wherein said amplitude A(t) is:

$$A(t) = \left\{ U\left(t - \frac{K}{(f_\infty - f_0)^2}\right) - U\left(t - \frac{K}{(f_\infty - f_s/2)^2}\right) \right\}$$

where $f_0$ is a start frequency; and where $f_S$ is the sampling frequency.

17. The system of claim 15, wherein said value of K varies uniformly over a range of possible K values to match different possible variations of said dispersed broadband signal.

18. The system of claim 15, wherein each of the different sets of time template parameters is generated from the time template equation:

$$w_k(t) = \cos\{2\pi(f_\infty t - 2\sqrt{Kt})\}\left\{U\left(t - \frac{K}{(f_\infty - f_0)^2}\right) - U\left(t - \frac{K}{(f_\infty - f_s/2)^2}\right)\right\}$$

where $f_0$ is a start frequency;

where $f_S$ is the sampling frequency;

where K is the curvature constant for the dispersed broadband signal; and the instantaneous frequency of the dispersed broadband signal asymptotically converges to $f\infty$.

19. The system of claim 15, wherein said at least one digital signal processor comprises a plurality of digital signal processors;

wherein said plurality of digital signal processors correspond to said plurality of different sets of time template parameters.

20. A system for detecting the presence of a dispersed broadband signal, comprising:

at least one digital signal processor, wherein the at least one digital signal processor includes an input which receives signals; and at least one memory coupled to the at least one digital signal processor storing code and data, wherein the at least one memory stores code executable by the at least one digital signal processor to perform a filter function, wherein the at least one memory stores a plurality of different sets of time template parameters, wherein each of said plurality of different sets of time template parameters corresponds to a respective time template, wherein each of the different sets of time template parameters is generated from the time template equation:

$$w_k(t) = \cos\{2\pi(2\sqrt{Kt})\}A(t)$$

where A(t) is an amplitude; and
K is the curvature constant for the dispersed broadband signal;
wherein K is different for each of said different sets of time template parameters;
wherein said at least one digital signal processor executes said code to perform said filter function using each of said plurality of different sets of time template parameters to compare said received signals with said respective time templates and generates a signal indicative of the presence of the dispersed broadband signal.

21. The system of claim 20, wherein said amplitude A(t) is:

$$A(t) = \left\{ U\left(t - \frac{K}{(f_\infty - f_0)^2}\right) - U\left(t - \frac{K}{(f_\infty - f_s/2)^2}\right) \right\}$$

where $f_0$ is a start frequency; and
where $f_s$ is the sampling frequency.

22. The system of claim 20, wherein said value of K varies uniformly over a range of possible K values to match different possible variations of said dispersed broadband signal.

23. The system of claim 20, wherein each of the different sets of time template parameters is generated from the time template equation:

$$w_k(t) = \cos\{2\pi(f_\infty t - 2\sqrt{Kt})\}\left\{ U\left(t - \frac{K}{(f_\infty - f_0)^2}\right) - U\left(t - \frac{K}{(f_\infty - f_s/2)^2}\right) \right\}$$

where $f_0$ is a start frequency;
where $f_s$ is the sampling frequency;
where K is the curvature constant for the dispersed broadband signal; and
the instantaneous frequency of the dispersed broadband signal asymptotically converges to $f\infty$.

24. The system of claim 20, wherein said at least one digital signal processor comprises a plurality of digital signal processors;
wherein said plurality of digital signal processors correspond to said plurality of different sets of time template parameters.

25. A method for detecting the presence of a dispersed broadband signal, the method comprising:
receiving signals, wherein said received signals include the dispersed broadband signal;
comparing said received signals with a plurality of time templates each designed to match possible forms of the dispersed broadband signal, wherein each of the different time templates is generated from the time template equation:

$$w_k(t) = \cos\{2\pi(f_\infty t - 2\sqrt{Kt})\}A(t)$$

where A(t) is an amplitude;
K is the curvature constant for the dispersed broadband signal; and
the instantaneous frequency of the dispersed broadband signal asymptotically converges to $f\infty$;
wherein K is different for each of said different sets of time template parameters; and
generating a signal indicative of the presence of the dispersed broadband signal after said comparing if said comparing indicates that said dispersed broadband signal is present.

26. The method of claim 25, wherein said amplitude A(t) is:

$$A(t) = \left\{ U\left(t - \frac{K}{(f_\infty - f_0)^2}\right) - U\left(t - \frac{K}{(f_\infty - f_s/2)^2}\right) \right\}$$

where $f_0$ is a start frequency; and
where $f_s$ is the sampling frequency.

27. The method of claim 25, further comprising:
determining if a match has occurred with any of said plurality of time templates in said comparing, wherein said determining is performed prior to said generating a signal indicative of the presence of the dispersed broadband signal.

28. A method for detecting the presence of a dispersed broadband signal, the method comprising:
receiving signals, wherein said received signals include the dispersed broadband signal;
comparing said received signals with a plurality of time templates each designed to match possible forms of the dispersed broadband signal, wherein each of the different time templates is generated from the time template equation:

$$w_k(t) = \cos\{2\pi(2\sqrt{Kt})\}A(t)$$

where A(t) is an amplitude; and
K is the curvature constant for the dispersed broadband signal;
wherein K is different for each of said different sets of time template parameters; and
generating a signal indicative of the presence of the dispersed broadband signal after said comparing if said comparing indicates that said dispersed broadband signal is present.

29. The method of claim 28, wherein said amplitude A(t) is:

$$A(t) = \left\{ U\left(t - \frac{K}{(f_0)^2}\right) - U\left(t - \frac{K}{(f_s/2)^2}\right) \right\}$$

where $f_0$ is a start frequency; and
where $f_s$ is the sampling frequency.

30. The method of claim 28, further comprising:
determining if a match has occurred with any of said plurality of time templates in said comparing, wherein said determining is performed prior to said generating a signal indicative of the presence of the dispersed broadband signal.

* * * * *